June 12, 1956  R. B. PRESSLER  2,749,755
SAMPLER MECHANISM
Filed July 31, 1952  3 Sheets-Sheet 1

RALPH B. PRESSLER
INVENTOR.

BY Edmund W.E.Kamm
ATTORNEY

June 12, 1956  R. B. PRESSLER  2,749,755
SAMPLER MECHANISM
Filed July 31, 1952  3 Sheets-Sheet 2
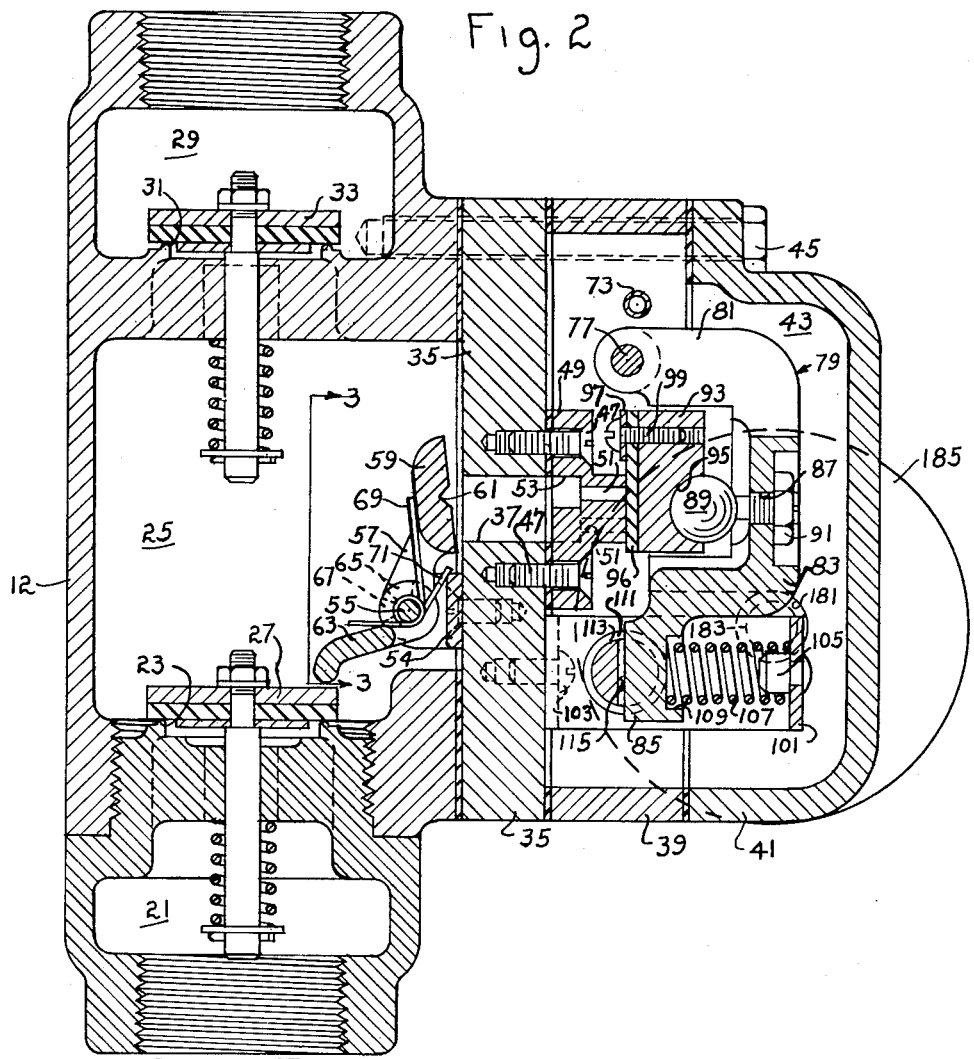
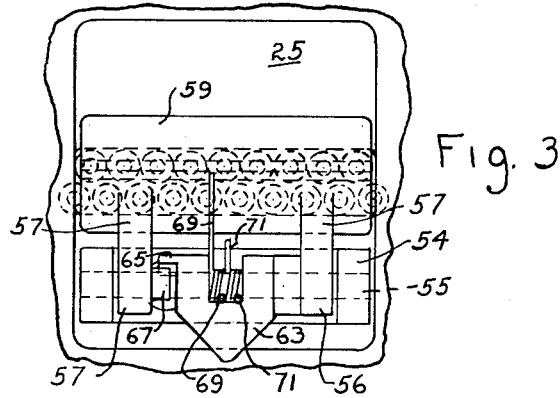
RALPH B. PRESSLER
INVENTOR.
BY Edmund W. E. Kamm
ATTORNEY June 12, 1956  R. B. PRESSLER  2,749,755
SAMPLER MECHANISM Filed July 31, 1952  3 Sheets-Sheet 3

RALPH B. PRESSLER
*INVENTOR.*

BY Edmund W. E. Kamm
ATTORNEY

United States Patent Office 2,749,755
Patented June 12, 1956

2,749,755

SAMPLER MECHANISM

Ralph B. Pressler, Fort Wayne, Ind., assignor to Bowser, Inc., Fort Wayne, Ind., a corporation of Indiana Application July 31, 1952, Serial No. 301,911

13 Claims. (Cl. 73—422)

This invention relates to a sampler mechanism. More specifically, it relates to a mechanism which will periodically abstract from a mixture of liquids flowing in a pipe line, a predetermined quantity of such liquid mixture so that the proportions of the constituents can be measured over a period of flow and, with a knowledge of the total quantity of liquids which have passed through the pipe line in that period, the total quantity of each constituent of the stream can be calculated for the period.

The mechanism is particularly adapted for use on oil wells since taxes and other charges as well as the operation of the well are based upon the quantity of oil produced by it. The well, however, produces other fluids in addition to oil, one of which is salt water. These fluids are mixed in the pipe line along with sediment such as sand, and all are measured together by the usual volumetric flow meter. Accordingly, unless the proportion of oil to salt water (and other constituents of the flow) is known, the reading produced by the meter is of little value. It is an object of the invention therefore to produce a device which will disclose the average percentage of the various constituents of the stream so that the total flow of each can be determined.

Another problem which is inherent in the taking of samples is that of securing a truly representative sample. In many cases the liquids are stratified in the pipe line so that a sample taken from a particular point or area in the cross-section of the pipe would be improper since this area is occupied by a stratified constituent and not by a proportional mixture of all of the constituents of the flow. It is another object of the invention to provide means for abstracting a truly representative sample of the flow.

A further object of the invention is to provide a structure which is rugged and which will not fail under the conditions to which it is subjected. Since many oils contain abrasives such as sand, an apparatus embodying moving parts can be readily disabled because of the abrasive action.

It is another object of the invention to produce an apparatus which is relatively simple and yet effective.

These and other objects will be apparent from a study of this specification and the drawings which are attached hereto, made a part thereof and in which:

Figure 2 is a sectional view of the sampler mechanism taken substantially on line 2—2 of Figure 1.

Figure 3 is an elevation of the sample collecting chamber control valve taken substantially on line 3—3 of Figure 2.

Figure 1:
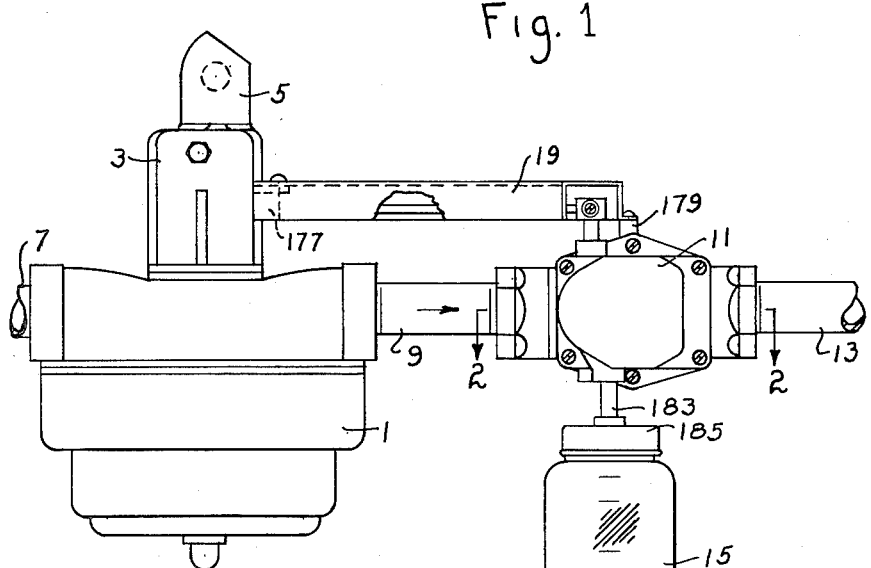
Figure 1 is a side elevation of the sampler and meter mounted in a flow line.

Referring to Figure 1 of the drawings, the numeral 1 represents a positive displacement flow meter which is suitable for use on the mixture of liquids being metered. It is obvious that any suitable meter will suffice although the meter shown is constructed along the lines of that disclosed in the patent to Blum No. 2,237,518, issued April 8, 1941.

The numeral 3 represents a gear mechanism later to be described in detail and 5 represents the usual register or counter which may be of the resettable type and which indicates the gallons of liquid put through the meter.

The conduit 7 supplies the liquid to the meter; conduit 9 conveys the liquid discharged from the meter to the sampler which is indicated generally by 11; and conduit 13 is the discharge conduit from the sampler.

A jar or container 15 collects the sample and is usually graduated as at 17 so that the contents can be gauged readily.

A shield 19 connects the housing of the gear mechanism 3 and the sampler and serves to protect the mechanism which transmits motion from the former to the latter.

Referring now to Figure 2, the conduit 9 is connected with the sampler body 12 and communicates with the inlet chamber 21 which communicates through a port 23 with the stratification chamber 25. A spring loaded check valve 27 permits the flow of liquid from chamber 21 to 25 but prevents flow in a reverse direction.

Liquid escapes from chamber 25 to chamber 29 through a port 31 which is controlled by a spring loaded check valve 33 which prevents flow from chamber 29 back to 25. Chamber 29 communicates with the discharge conduit 13.

Chamber 25 is substantially rectangular in cross-section at the point in its length where the sample is removed and one side is formed by a plate 35 which is provided with a vertical slot 37 which extends from a point closely adjacent the bottom of the chamber to a point closely adjacent the top thereof.

A spacer body 39 and a cap 41 are mounted on the plate in superposed relation on the side of the plate opposite chamber 25 to form a chamber 43. The plate 35, body 39 and cap 41 are all supported on body 12 by means of suitable fasteners 45.

Figure 4:
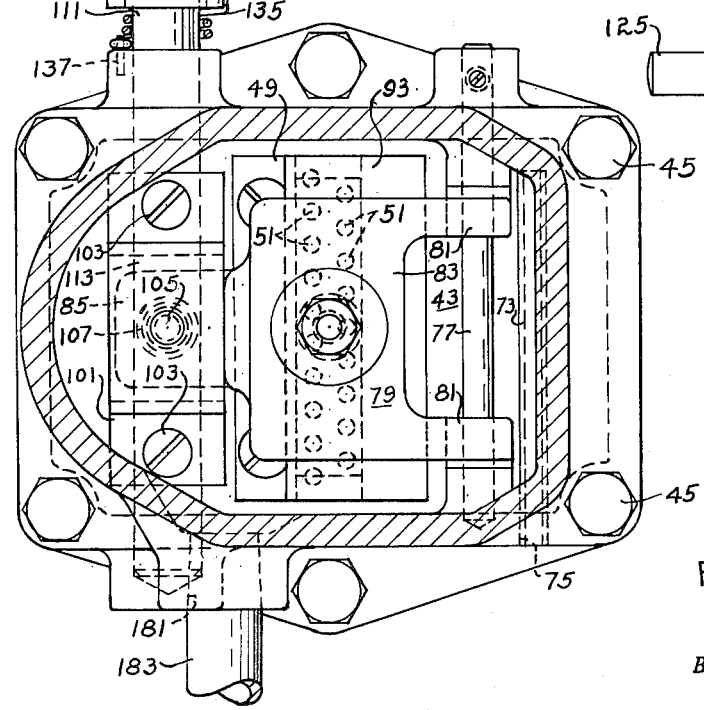
Figure 4 is an elevation of the sample control valve.

Mounted on plate 35, by means of fasteners 47, within chamber 43 and in sealing relation over the slot 37, which forms a settling chamber, is a port plate 49 which has preferably two rows of ports 51. As shown in Figure 4, the holes in the one row are preferably staggered with respect to those in the other. Also, as shown in Figure 2, each hole is counterbored at 53 on the side adjacent the chamber or slot 37. A bracket 54 is mounted on plate 35 transversely to slot 37 and carries a vertical shaft 55.

Pivotally mounted on the shaft 55 in chamber 25 are two arms 57 which carry a valve 59 which is adapted to close the inlet side of the slot or chamber 37. The valve is provided with a groove 61 which runs the full height of the valve so that the valve is by-passed by the groove for a purpose set forth below. A second lever 63 is also pivotally mounted on the shaft 55 and extends into the path of the valve 27 so as to be operated thereby.

A lug 65 extends laterally from lever 63 toward one arm 57 and a lug 67 extends from said arm toward said lever so as to lie in the path of lug 65. The lugs are arranged as shown in Figure 2 so that as the arms move clockwise relative to lever 63, the lugs engage, and vice versa.

A spring 69 is supported on shaft 55 and bears on the lever 63 and valve 59 to urge the latter clockwise relative to the lever. A second spring 71 is mounted on the shaft and bears on the bracket 54 and lever 63 to rotate the lever with valve 59, counterclockwise. Preferably, however, the spring 71 is of such construction that while it opens the valve 59, it does not force the arm 63 into contact with the valve 27.

Thus if the valve 27 opens slightly the valve 59 will not be actuated; if it opens further, the valve 59 will be moved toward closed position; and if the valve 27 moves further after valve 59 is closed, the arm 63 will rotate clockwise with respect to arms 57 and against the operation of spring 69. As valve 27 closes, spring 71 returns the parts to the normal position shown in Figure 2.

As shown in Figures 2 and 4, the chamber 43 is provided with a vent tube 73 which is sealingly fitted in a hole 75 through the bottom of the chamber and extends to a point adjacent the top of the chamber. Atmospheric pressure is thus admitted upwardly into the chamber.

A shaft 77 is fixedly mounted in the chamber 43 in a vertical position substantially parallel to the rows of ports 51. A valve actuating lever 79 is comprised of a pair of arms 81 rotatably mounted on shaft 77, a valve supporting section or web portion 83, and a cam follower portion 85.

The web portion 83 has a threaded hole 87 formed through it in which is mounted a spherical, shanked journal 89. A lock nut 91 mounted on the shank holds the journal in its adjusted position.

A valve supporting plate 93 is provided with a bearing 95 to receive the journal. A valve 96 of synthetic rubber or other suitable material is mounted on the plate 93 adjacent the ports 51 by means of strip 97 and fasteners 99.

As shown in Figure 4, the valve 96 and plate 93 extend longitudinally beyond the arms 81. The arms and web are, as shown in Figure 2, disposed about three sides of the valve plate so that it and the valve cannot pivot markedly in a plane which is parallel to that of the port plate but they can tilt somewhat about the center of the journal so that the valve will align itself in sealing relation with the port plate 35 to close the ports 51.

A spring support 101 is fixed within the chamber, as by fasteners 103, in a position to straddle the follower 85. A spring guide 105 is fixed thereto and a compression spring 107 is confined between the support and the rear side of the cam follower 85 which is recessed at 109 to form a spring seat.

Mounted for oscillation within the spacer body 39 is the cam shaft 111. The shaft is substantially parallel with shaft 77 and in the region of the follower 85 it is cut away to form a semi-cylindrical cam 113. The flat surface 115 of the cam is preferably spaced slightly from the surface of the follower when it is parallel thereto so that the shaft 111 may be rotated through a small arc without inducing motion in the follower. The amount of this clearance is, of course, regulated by the adjustment of the journal 89.

Figure 5:
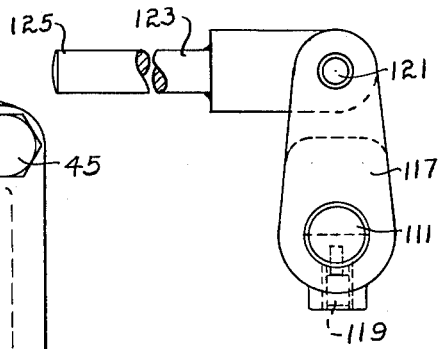
Figure 5 is an elevation of the anvil rod and the lever actuated thereby.
Figure 6:
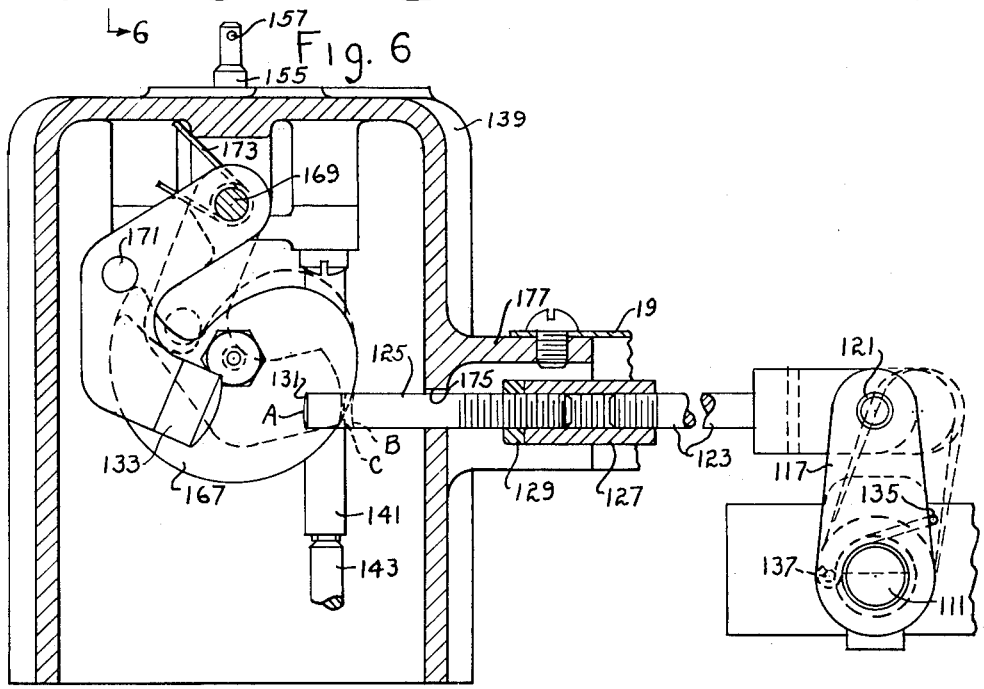
Figure 6 is an elevation taken substantially on line 6—6 of Figure 7 showing the hammer and the cam for actuating it, together with the anvil rod.

As shown in Figures 5 and 6, a lever 117 is fixed to the shaft 111 by a suitable fastener 119. Pivoted at 121 to the top of the lever is a thrust rod which is made in two parts 123, 125 which are joined together by a nut 127. The thread on part 123 fits the nut rather tightly so that it will retain its position in the nut. The other part 125 fits more loosely in the nut and is held in adjusted position by a lock nut 129. The free end 131 of the part 125 lies in the path of a hammer 133 and serves as the anvil of the thrust rod.

A light spring 135 is supported on shaft 111 and has one end bearing on the lever 117 in a direction to urge the anvil toward the hammer, the motion in this direction being limited by contact between one edge of the cam 113 and the follower. This spring will hold the anvil normally in the position indicated by A (Fig. 6). The other end of the spring rests on a fixed pin 137 set in 39.

It should be noted that in Figure 6, the lever 117 and hammer 133 and associated parts have been rotated 90 degrees from each other in order to clearly depict the relative positions of the parts in the various conditions.

Figure 7:
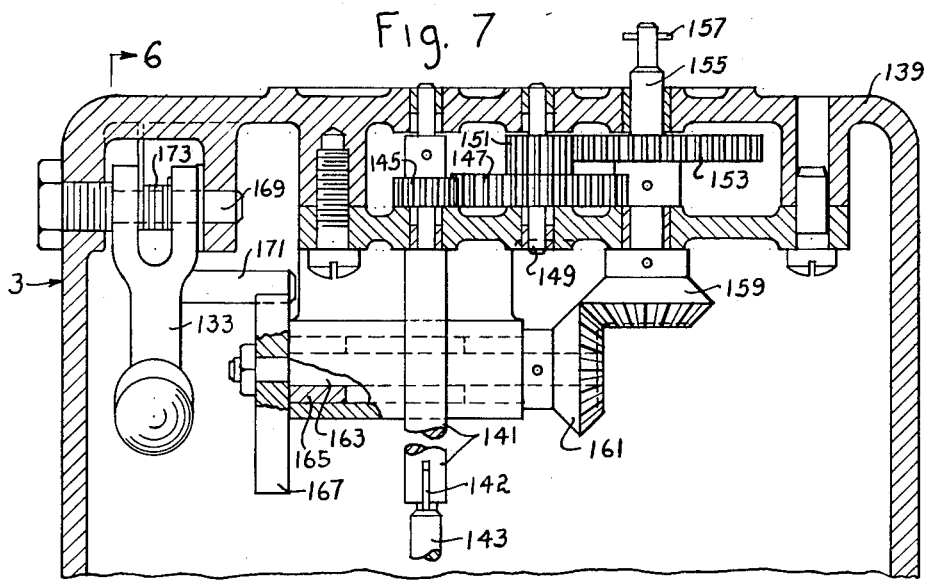
Figure 7 is an elevation partly in section showing the meter driven mechanism which actuates the cam and hammer.

Referring now to Figure 7, the mechanism 3 comprises a housing 139 which is mounted on the meter 1 and which has rotatably mounted therein a shaft 141 which is connected by a coupling 142 to the meter output shaft 143. A gear 145 is fixed to shaft 141 and meshes with a gear 147 on the jack shaft 149 also mounted in the housing.

The gear 147 carries a gear 151 which meshes with gear 153 mounted on the shaft 155 which is also supported in suitable bearings in the housing.

The upper end of shaft 155 is provided with a pin drive 157 which serves to actuate the register 5.

The lower end of the shaft 155 carries a miter gear 159 which meshes with a similar gear 161 mounted on a shaft 163 which is supported in a bearing 165 of the housing 139.

Mounted on the other end of shaft 163 is a cam 167. The hammer 133 is pivotally mounted on a pin 169 supported by the housing and carries a laterally projecting follower 171 which lies in the path of the cam 167 for actuation thereby. A relatively strong spring 173 is mounted on pin 169 and has one end bearing on the housing and the other on the hammer in such a direction as to urge the hammer toward the push rod anvil.

The thrust rod 125 enters the case 139 through an opening 175 therein. The case thus loosely supports the rod in position to be struck by the anvil.

A lateral projection 177 on the case supports one end of the shield 19 while the other end is supported by a boss 179 on the sampler 11.

As shown particularly in Figures 2 and 4, a threaded opening 181 is formed in the bottom of chamber 43 and a discharge tube 183 is mounted therein. On the lower end of the tube is mounted a cap 185, which is adapted to receive the screw top jar 15.

*Operation*

Referring to Figures 1, 2 and 7 particularly, it will be seen that the mixture of liquid enters the meter 1 under pressure from pipe 7 and actuates the meter output shaft 143 in accordance with the volume of liquid flowing. The meter in turn actuates shaft 141 and through the gearing 145, 147, 151 and 153, the shaft 155.

The upper end of the shaft drives the register 5 while the lower end drives the cam 167 through gears 159, 161 and shaft 163. Thus the cam is rotated in time with the meter and the cam will make one revolution each time a predetermined quantity of liquid passes through the meter. The cam in turn cocks the hammer 133, tensioning spring 173, once each revolution and suddenly releases the hammer so that it strikes the anvil and displaces the push rod 123—125 to the right (Figure 6) to some position such at "B."

This displacement of the rod rotates the cam shaft 111 and cam 113 to tilt one edge of the cam face 115 into contact with follower 85 and moves the follower against spring 107. This lifts the ball journal 89 from its socket 95 and permits the pressure applied to valve 96 through ports 51 to open the valve momentarily so that a sample enters the atmospheric chamber 43 from the chamber 37 which is at a higher pressure.

The opening of the valve is automatic once the hammer is tripped and is of uniform duration for each operation. The size of the sample is therefore independent of the rate of flow of fluid in the meter.

If the liquids tend to stratify as stated above, the apparatus abstracts a sample from a quiescent zone where stratification is permitted to occur. In such case, the horizontal cross-sectional area of liquid at every level in chambers 25 and 37 should be substantially the same, to the end that each layer of liquid occupies a height proportional to the percentage which the quantity of that liquid in the chamber bears to the whole liquid content of the chamber. A sample drawn from all levels over the full height of the chamber should be a truly representative sample. When stratification is not present, the shape of the chambers is not important.

This is accomplished by the structure shown particularly in Figures 2, 3 and 4. Liquid enters chamber 21 from the meter horizontally under pressure and as it flows into chamber 25 it opens valve 27. It opens valve 33 to flow into chamber 29.

Two conditions of flow may occur, namely, slow or fast. Under conditions of slow flow the valves 27 and 33 will open only slightly and since slow flows will not materially disturb the stratification of the liquids in chamber 25, the valve 59 is not closed. Thus there is free communication between chambers 25 and 37. It is to be understood that the flow of liquid to the inlet chamber 21 is intermittent rather than continuous due to the design of the conventional oil well pump. When the oil well pump is pumping only a few barrels of oil per day, a slow intermittent flow with no turbulence is maintained. While on the other hand, the oil well pump is pumping several barrels of oil per day a fast, intermittent flow with turbulence is obtained.

If a flow is of sufficient turbulence to distrub the stratification in chamber 25, the valve 27 in opening to admit such a flow, lifts lever 63 and closes valve 59. Should the valve 27 open even further after valve 59 has been closed, the lever 63 will rotate relative to valve 59 against the action of spring 69.

Thus under conditions of relatively fast flow the chamber 37 is isolated from chamber 25 except for the communication through the ends of groove 61 and the liquid would be given an opportunity to stratify in the chamber 37 during the interval between operations of the valve 96. The groove 61 allows a slight pressure to be maintained on the liquid trapped in chamber 37 to force the liquid through the ports 51 when the valve 96 is opened.

The valve 33 is provided to prevent the improper collection of a sample since if the discharge pipe 13 would run upwardly from the sampler, there would be a tendency during periods of slow flow or no flow for the water to settle out at the lowest point which would load the chambers 25 and 37 with water. If, on the other hand, the pipe ran downwardly, there would be a tendency to load the chambers with oil. In either case, the sample taken would not be a representative sample. By using the valves 27 and 33 which are open only during flow and only to the extent necessary to pass the flow, the sample in the chambers 25 and 37, even though it is stratified, is a truly representative sample.

Since the ports 51 are so arranged as to take samples across the entire vertical dimension of the chambers 25 and 37 and since the horizontal cross-sections of the liquid in chambers 25 and 37 are substantially equal at all levels, the sample contains proportional quantities of the various liquids as they exist in the mixture in chamber 25.

In other words, since the chambers 25 and 37 are substantially rectangular parallelepiped, the depth of the various stratified liquids will be in proportion to the quantity of such liquid present in the chambers. Now, since the sample is taken from numerous closely but evenly spaced ports 51 which are disposed along one side of the chambers 25 and 37 from the bottom to the top thereof, the number of ports drawing liquid from a particular stratum will be in proportion to the depth of that stratum. Accordingly, the sample will be representative.

The same situation obtains when the sample is drawn from chamber 37 when the valve 59 is closed.

Obviously, the plate 49 may be made with a single slot to serve as an orifice instead of the ports 51 which provide in effect a continuous opening. The ported plate is preferred over the slotted plate because of the strength of the former.

Since the number of operations of valve 96 is a function of the speed of operation of the meter, the number of samples taken is proportional to the quantity of liquid delivered over a given period of time.

The adjustment 129 in the push rod provides a convenient means for changing the degree of motion imparted to the push rod by the hammer. If the pushrod 125 is extended toward the hammer, the cam 113 will be turned to a greater degree with the result that the ports 51 will be open for a longer period of time and the sample taken will be larger. The converse is true if the push rod 125 is shortened.

In any case, the push rod 125 must not be extended toward the hammer to the extent that in its tripped position the hammer will hold the push rod in a position with the valve 96 open. In other words, assuming that the starting position is at A, the anvil or end of the push rod 125 should not be held displaced to the right (Figure 6) of a position C when the hammer is in the tripped position. The spring 135 serves to return it to the A position as the hammer starts to retract. The distance A—C represents the lost motion afforded by the spacing of the cam face 115 from the follower 85.

The samples taken, as described above, are collected in jar 15 and at the end of the run the operator can readily determine the thickness of each strata of liquid and sediment in the jar. By dividing the height of each strata by the total height, he can obtain the percentage of each material. The multiplication of the quantity of liquid totalized on the register 5 by such percentages will yield the quantity of each material which has been dispensed over the period.

It is obvious that instead of a fluid meter, any other type of motor may be used to drive the sampling mechanism by being connected to the shaft 141 (Figure 7). While it is preferable that the motor be in time with the flow in order to insure a truly representative sample, in many instances, in practical applications, this is not necessary, so that the rate of flow of fluid may be independent of the rate of taking the samples. In such cases the sample in the jar is a true sample of what was passing through the flow line at the time the samples were taken.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a sampling mechanism adapted to be driven by a meter disposed in a flow line for liquid, the combination of a stratification chamber communicating with said flow line, means defining an inlet and an outlet for the chamber and flow actuated check valves mounted in said inlet and outlet, means defining port means communicating with said chamber on one side thereof and communicating with said chamber substantially from the top to the bottom thereof, a valve for said port means, means mounting said valve for movement to open and close the port means, means for urging said valve to close said port means, means operable by the meter for periodically opening said valve, and means associated with said port means for trapping the effluent from the port means.

2. In a sampling mechanism adapted to be driven by a meter disposed in a flow line for liquid, the combination of a first stratification chamber having means defining an inlet and an outlet connected with the flow line, a second stratification chamber communicating with the first chamber from the top to the bottom thereof, a valve mounted for movement to and from a position for substantially closing off said second chamber from the first chamber, means for withdrawing a sample from said second chamber, and means responsive to a predetermined rate of flow through said first chamber for actuating said valve.

3. In a sampling mechanism adapted to be driven by a meter disposed in a flow line for liquid, the combination of a first stratification chamber having means defining an inlet and an outlet connected with the flow line, a second stratification chamber communicating with the first chamber from the top to the bottom thereof, a valve mounted for movement to and from a position closing off said second chamber from the first chamber, said valve being ported at least in two places to permit a slight pressure on said second chamber while the valve is closed, means for withdrawing a sample from said second chamber, and means responsive to a turbulent flow through said first chamber for actuating said valve.

4. In a liquid sampling mechanism adapted to be driven by a liquid meter, the combination of a flow line for the liquid, a first stratification chamber having substantially equal cross-sectional areas at all levels thereof and having means defining an inlet and an outlet connected with the flow line, a second stratification chamber having substantially equal cross-sectional areas at all levels thereof and communicating with the first chamber substantially from the top to the bottom thereof, a valve mounted for movement to and from a position for substantially closing off said second chamber from the first chamber, means for withdrawing a sample from said second chamber comprising means defining ports, said ports being disposed substantially coextensive with the height of said second chamber, a sample valve therefor, means mounting said valve for movement to open and close said ports, means for normally urging said valve closed and means actuated by the meter for periodically opening the sample valve, and means responsive to the rate of flow through said first chamber for actuating said first named valve.

5. In a liquid sampling mechanism adapted to be driven by a liquid meter, the combination of a flow line, means defining port means in communication with said flow line through which a sample is withdrawn, a valve for said port means, means mounting said valve for movement to open and close the port means, means for normally holding said valve closed, means for periodically opening said valve including a hammer, means actuated by the meter for periodically actuating the hammer, means disposed in the path of said hammer for actuation thereby, a cam, means connecting said cam for operation by the hammer actuated means, means for opening the valve including a cam follower disposed for operation by the cam, and lost motion means for rendering said cam effective to actuate the follower only after a predetermined motion of said cam.

6. In a liquid sampling mechanism adapted to be driven by a liquid meter, the combination of a flow line for the liquid, a first stratification chamber having means defining an inlet and an outlet connected with the flow line, a second stratification chamber communicating with the first chamber from the top to the bottom thereof, a first valve mounted for movement to and from a position closing off said second chamber from said first chamber, means defining ports for maintaining communication between said chambers, at least at two different levels, when the first valve is closed, rate of flow responsive means connected to actuate said first valve, means including a second valve for withdrawing a sample from said second chamber, means for actuating said second valve comprising a hammer, means connected to the meter for periodically cocking the hammer and tripping it and means disposed to receive a blow from the hammer and connected to open the second valve.

7. In a liquid sampling mechanism adapted to be driven by a liquid meter, the combination of a flow line for the liquid, a first stratification chamber having substantially equal cross-sectional areas at all levels thereof and having means defining an inlet and an outlet connected with the flow line, a second stratification chamber having substantially equal cross-sectional areas at all levels thereof and communicating with the first chamber substantially from the top to the bottom thereof, a valve mounted for movement to and from a position closing off said second chamber from said first chamber, means defining ports for maintaining communication between said chambers, at least at two different levels, when the first valve is closed, rate of flow responsive means in the flow line connected to actuate said first valve, means including a second valve for withdrawing a sample from said second chamber, means for actuating said second valve comprising a hammer, yieldable means for urging said hammer in one direction, cam means connected for actuation by said meter for urging said hammer in an opposite direction against the action of the spring and thereafter releasing it, means disposed in the path of the hammer when it is moved by the spring and means connecting said latter means to open the second valve.

8. In a liquid sampling mechanism adapted to be driven by a liquid meter, the combination of a flow line, means defining port means in communication with said flow line through which a sample is withdrawn, a valve for said port means, means mounting said valve for movement to open and close the port means, means for normally holding said valve closed, means for periodically opening said valve including a hammer, means actuated by the meter for periodically actuating the hammer, means disposed in the path of said hammer for actuation thereby, a cam, means connecting said cam for operation by the hammer actuated means, means for opening the valve including a cam follower disposed for operation by the cam, lost motion means for rendering said cam effective to actuate the follower only after a predetermined motion of said cam, and adjustable means disposed between said follower and said valve for adjusting the magnitude of said lost motion.

9. In a liquid sampling mechanism adapted to be driven by a liquid meter, the combination of a flow line for the liquid, a chamber communicating with said flow line, said chamber having substantially equal cross-sectional areas at all levels thereof, a means defining port means disposed substantially vertically at one side of said chamber and substantially coextensive with the chamber, a normally closed valve for said port means, means mounting said valve for movement to open and close the port means, trip means actuated by said meter for periodically opening said valve for a predetermined time, which is independent of the speed of the meter, and means for receiving the liquid flowing from the port means.

10. In a liquid sampling mechanism adapted to be driven by a liquid meter, the combination of a flow line for the liquid, a chamber communicating with said flow line, said chamber having substantially equal cross-sectional areas at all levels thereof, a port plate having a plurality of equally spaced holes extending substantially vertically at one side of said chamber, communicating with and substantially coextensive with the chamber, a normally closed valve for said port plate, means mounting said valve for movement to open and close the port means, trip means actuated by said meter for periodically opening said valve for a predetermined time which is independent of the speed of the meter, and means adapted for receiving the liquid flowing through the holes.

11. In a liquid sampling mechanism adapted to be driven by a liquid meter, the combination of a flow line for the liquid, a chamber connected with said flow line, said chamber having substantially equal cross-sectional areas at all levels thereof, means defining a recess in the side of said chamber, open thereto and having substantially equal cross-sectional areas at all levels thereof, means defining port means communicating with the recess, a first valve normally closing said port means, means mounting said valve for movement to open and close the port means, trip means actuated by said meter for periodically opening said first valve within a predetermined time interval, means for reclosing said first valve, a normally open second valve for throttling communication between said chamber and recess, and means responsive to the increase of rate of flow of the liquid into said chamber for closing said second valve.

12. In a sampling mechanism adapted to be driven by a motor, the combination of a flow line, a first stratification chamber having means defining an inlet and an outlet connected with the flow line, a second stratification chamber communicating with the first chamber from the top to the bottom thereof, a valve mounted for movement to and from a position for substantially closing off said second chamber from the first chamber, means defining ports for maintaining communication between said chambers, at least at two different levels, when the first valve is closed, means driven by the motor for withdrawing a sample from said second chamber, and means responsive to a predetermined rate of flow through said first chamber for actuating said valve.

13. In a liquid sampling mechanism adapted to be driven by a motor, the combination of a flow line for the liquid, a chamber connected with said flow line, said chamber having substantially equal cross-sectional areas at all levels thereof, means defining a recess in the side of said chamber, open thereto and having substantially equal cross-sectional areas at all levels thereof, means defining port means communicating with the recess, a first valve normally closing said port means, means mounting said valve for movement to open and close the port means, trip means actuated by said motor for periodically opening said first valve within a predetermined time interval, means for reclosing said first valve, a normally open second valve for throttling communication between said chamber and recess, and means responsive to the increase of rate of flow of the liquid into said chamber for closing said second valve.

References Cited in the file of this patent

UNITED STATES PATENTS

| | | |
|---|---|---|
| 1,138,994 | Steele | May 11, 1915 |
| 1,474,807 | Yetman et al. | Nov. 20, 1923 |
| 2,272,313 | Waters | Feb. 10, 1942 |
| 2,548,193 | Blum | Apr. 10, 1951 |
| 2,576,737 | Wendel | Nov. 27, 1951 |
| 2,584,106 | Batchelder et al. | Feb. 5, 1952 |
| 2,589,712 | Langsenkamp et al. | Mar. 18, 1952 |
| 2,591,274 | Mohoney | Apr. 1, 1952 |
| 2,623,544 | Waters et al. | Dec. 30, 1952 |
| 2,668,447 | Lenhart | Feb. 9, 1954 |